B. T. Roney
Harvester Cutter
No. 29999.  Patented Sep. 11, 1860.
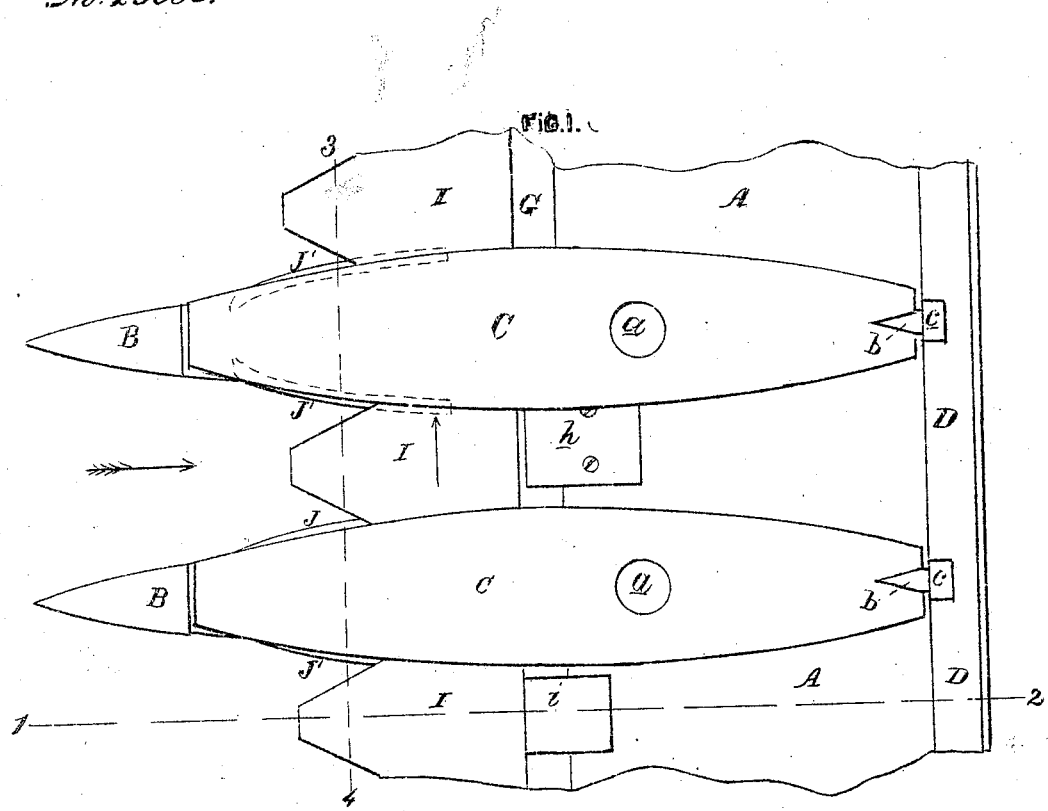
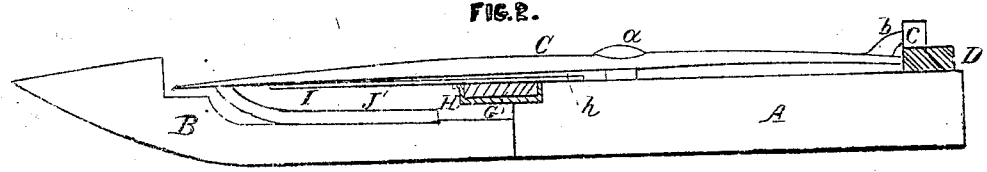
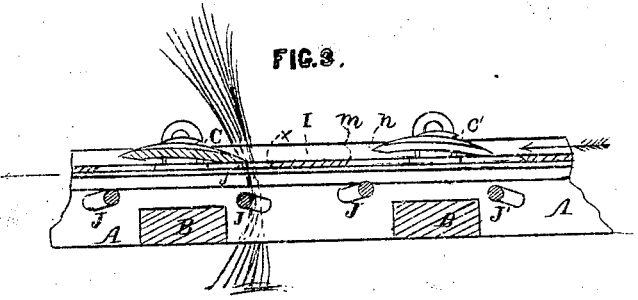
WITNESSES  Henry Howson  
Charles Howson
B. T. Roney

UNITED STATES PATENT OFFICE.

BENJAMIN T. RONEY, OF PHILADELPHIA, PENNSYLVANIA.

IMPROVEMENT IN HARVESTER-CUTTERS.

Specification forming part of Letters Patent No. 29,999, dated September 11, 1860.

*To all whom it may concern:*

Be it known that I, BENJAMIN T. RONEY, of the city and county of Philadelphia, and State of Pennsylvania, have invented certain new and useful Improvements in Harvester-Cutters; and I do hereby declare the following to be a full, clear, and exact description of the same, reference being had to the accompanying drawings, and to the letters of reference marked thereon.

My invention consists in certain upper knives so connected to the cutter-beam that they can tilt laterally to a limited extent, and having certain rods, or their equivalents, arranged in respect to the cutting-edges in the manner described hereinafter, in combination with lower reciprocating knives for the double purpose of bending the stalks of grain or grass to the best position for being acted upon by the knives, and for causing the edges of the latter to bear against each other, thereby producing the best cutting effect.

My improvement also consists in the peculiar arrangement, described hereinafter, of the aforesaid upper tilting knives and their rods in respect to the guard-fingers and cutter-bar, whereby the short blades of grass are readily discharged from the cutting apparatus, and the clogging and interruption of the cutters thereby avoided.

In order to enable others skilled in the art to make and use my invention, I will now proceed to describe its construction and operation.

On reference to the accompanying drawings, which form a part of this specification, Figure 1 is a plan view of part of my improved cutting apparatus for harvesters; Fig. 2, a transverse section on the line 1 2, Fig. 1; and Fig. 3, a longitudinal section on the line 3 4, Fig. 1, looking in the direction of the arrow.

Similar letters refer to similar parts throughout the several views.

A is the cutter-beam, to the under side of which are secured at suitable intervals the guard-fingers B B.

C C are the upper knives, each knife being secured to the cutter-beam by a screw pin or bolt, $a$, and by a pin, $b$, attached to or forming a part of the rear end of the knife, the said pin fitting snugly, but so as to vibrate freely in a projection, $c$, of the bar D, which is secured to the rear end of the cutter-beam.

The hole in the knife through which the pin $a$ passes is somewhat larger than the said pin, and the head is so formed in respect to the knife that the latter can be tilted backward and forward laterally to a limited extent, but can have no other movement independently of the cutter-beam.

Each knife C is slightly convex on the top and concave on the under side, as seen in Fig. 3, the opposite curved edges being sharpened.

G is the cutter-bar, situated in the guide H, which is secured to the front of the cutter-beam A, the bar being prevented from rising from its guide by plates $h$, projecting from the cutter-beam, and being supported by its lips $i$, which rest and slide on the said beam.

To the cutter-bar are attached, by riveting or otherwise, the under knives, I I, of the form represented in Fig. 1, these knives being sharpened by beveling their edges from the under side outward, as seen in Fig. 3.

To the under side and near the front edge of each of the upper knives, C, are secured the bent ends of the two rods J and J', the straight portions of which are situated three-eighths of an inch, or thereabout, below the lower knives, the form of the rods and their lateral position in respect to the edges of the upper knives being seen in Fig. 1, on reference to which it will be observed that the rods project, one rod beyond one edge and the other rod beyond the opposite edge of the said upper knife, for a purpose which will be explained hereinafter. The ends of the rods terminate at a point so far distant from the cutter-bar and cutter-beam, and the finger is situated so far below the knives, that there is an intervening open space for the disposal and clearance of short blades of grass, which would otherwise tend to clog and interfere with the action of the cutting apparatus.

A reciprocating motion is imparted to the cutter-bar G and the under knives attached to the same by any of the usual driving apparatus. As long as no grain or grass is presented to the above-described cutters the under knives will reciprocate without disturbing the horizontal position of the upper knives, and without bringing the cutting-edges of the latter in close contact with those of the former, for it should be understood that when the upper knives occupy a horizontal position they are a short distance above the lower knives. Supposing, however, that the cutter-bar and cutters are moving in the direction of the arrow, Fig. 3, and that a bunch of standing grain or grass intervenes between the cutting-edge $x$ of the lower knife, I, and the cutting-edge $y$ of the upper knife, C, it will be evident that the cutting-edge $x$, before it comes in contact with the edge $y$, will bend the stalks of grain or grass against the rod J, inasmuch as the bar projects beyond the cutting-edge of the upper knife. The pressure of the stalks against this rod will tend to tilt the upper knife laterally, so as to present its cutting-edge to that of the lower knife, bringing the two edges to bear on each other with that force which insures the best cutting effect. Moreover, as the edge $x$ presses against the stalks at a point above the rod J, they must be bent, as shown in the figure, before the severing action of the knives takes place, and this bent position of the stalks is most advantageous, inasmuch as the cut is made at an acute angle, instead of at right angles, to the direction of the stalks, as in other cutting apparatus. When the bar G, with the under cutters, moves in a contrary direction to that pointed out by the arrow, and the stalks intervening between the cutting-edge $m$ of the knife I and the edge $n$ of the knife C, Fig. 3, the latter knife will be tilted over, so that the two cutting-edges coincide with precisely the same effect on the bent stalks as that above described. It will thus be seen that as the under knives reciprocate a constant tilting backward and forward of the upper knives takes place, with a result which requires no further description.

Independent of the above-described duties performed by the rods J and J', their constant vibration assists to clear away the short blades of grass, which have a tendency to collect between the knives and the guard-fingers, the open space previously alluded to affording facilities for the ready discharge of these short blades by the vibrating motion of the rods.

I wish it to be understood that I do not claim broadly so arranging either the upper or lower knives of harvester-cutters that they shall tilt laterally for the purpose of producing a shearing effect; but that

I claim as my invention, and desire to secure by Letters Patent—

1. The upper knives, C, so connected to the cutter-beam that they can tilt laterally to a limited extent, and having the rods J and J', or their equivalents, arranged in respect to the cutting-edges of the said upper knives, as set forth, in combination with the lower reciprocating knives, I, for the purpose specified.

2. The peculiar arrangement of the vibrating upper knives, C, and their rods J and J' in respect to the cutter-bar G and guard-finger B, whereby an open space is afforded for allowing the vibrating rods to discharge the clogged grain or grass from the cutters, as set forth.

In testimony whereof I have signed my name to this specification in the presence of two subscribing witnesses.

B. T. RONEY.

Witnesses:
 HENRY HOWSON,
 CHARLES HOWSON.